United States Patent Office
3,298,976
Patented Jan. 17, 1967

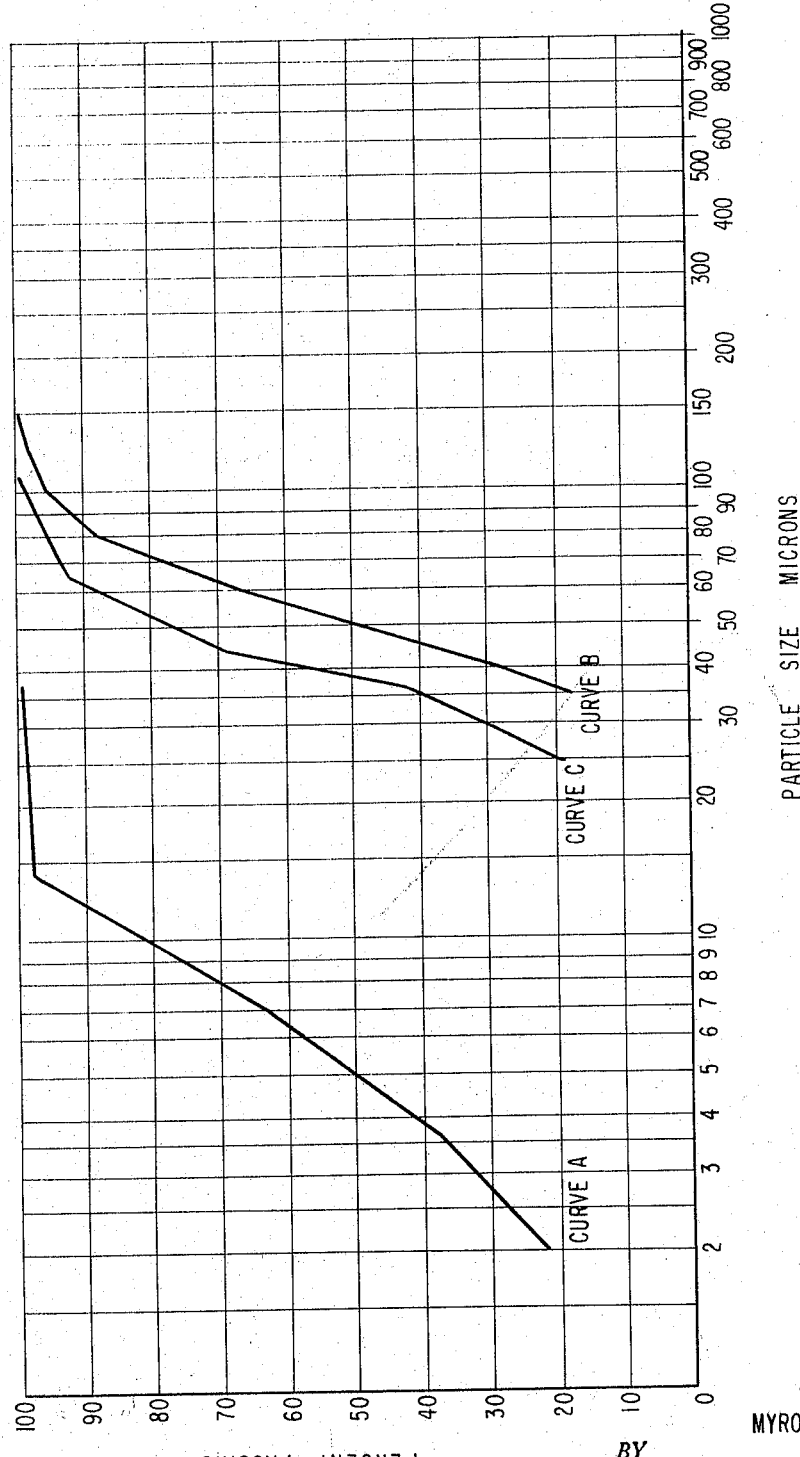

3,298,976
CELLULAR POLYURETHANE CONTAINING BARYTES AND METHOD OF MAKING SAME
Myron H. Reinhart, Richmond, Va., assignor to E. R. Carpenter Company, Richmond, Va., a corporation of Virginia
Filed May 12, 1966, Ser. No. 549,654
12 Claims. (Cl. 260—2.5)

This application is a continuation-in-part of application Ser. No. 302,298, filed Aug. 15, 1963 which is, in turn, a continuation-in-part of application Ser. No. 218,435, filed Aug. 21, 1962 and now abandoned.

The present invention relates to novel cellular polyurethane materials and to the method of preparing the same and, more particularly, the present invention relates to cellular polyurethane materials having improved physical characteristics substantially similar to those of foamed rubber, and the method of making such polyurethanes.

Polyurethane foams, which are considerably less expensive to manufacture, have replaced foamed rubber latex in many products commercially available today. However, many polyurethane foams have a number of limiting physical characteristics which render them less satisfactory for use in certain fields such as seat cushions for chairs and sofas, mattresses, and the like, and therefore foam rubber is still preferred for such use in many cases where the difference in price between the two is not important.

While polyether urethane foamed materials are generally preferred over polyester urethane foamed materials for cushioning applications because of their superior resilience, polyether urethane foams still do not have the properties which would render them as suitable as foamed rubber products in the cushioning field.

One of the drawbacks to the use of polyurethane foams is the fact that they tend to have a low modulus and rleatively low load-carrying capacity at high deflection. At the same time, a low load capacity at low deflection is important since it is highly desirable that a cushion offer little resistance when a person first sits on it. After the person is seated, the cushion should then offer some substantial resistance when the cushion is relatively highly deflected.

The tendency of polyurethane foam to offer little resistance at relatively high deflection is called "bottoming out" and is due to a lack of sufficient support at the higher compression values. When a person sits on a cushion, it is usually compressed up to 90% or more of its original thickness. Thus a person sitting on a cushion of polyurethane foam will tend to sink through the cushion to feel the slats or springs of the supporting base, whereas a cushion fabricated from foam rubber latex will not do this. It is assumed that this occurs because of the fact that the increased density in the latex cushion will tend to prevent the person's body from sinking through. Yet heretofore when a polyurethane foam was compounded to give better support at high compression ratios, the foam became much too stiff at the lower compression values, and resulted in an uncomfortable cushion.

A further problem of polyurethane foams is their fatigue or softening in use characteristics. Polyurethane foam cushions will soften considerably more rapidly than will foam rubber latex cushions because of the fact that the crosslinked condition of the polyurethane foams, which takes place in the course of the reaction used to improve the firmness values of the foams, tends to deteriorate under use conditions. The deterioration of the crosslinks in the polyurethane foam will tend to accentuate the "bottoming out" characteristics.

A further property in which polyurethane foams are deficient is hysteresis, or internal friction, and, as a result, the polyurethane foam cushions feel less buoyant than the foam rubber cushions.

Polyurethane foams may be manufactured with a considerable range of properties, depending upon the resin employed and upon the amount of water used in the formulation. Thus in a typical foam, the quality and the properties of the foam will depend to a large extent upon two types of polymerization reactions and the degree to which these are allowed to occur. The first reaction results in linear polymerization of the resin, thus extending the polymer chains and imparting tensile strength and rubberiness to the resins. The second reaction results in crosslinking and/or branching of the polymer structure, which imparts stiffening and load-bearing properties to the resin. The rates of these reactions may be controlled by the type and amounts of the reaction catalysts used.

It is generally accepted that the firmness or stiffness of a foam is proportional to the amount of crosslinking and/or branching that is effected in the polymerization reactions and this, in turn, is proportional to the amount of water and to the amount of polyisocyanate present during the reaction.

It is well known that when two foams with the same firmness values are compared in physical characteristics, the superior foam will almost always be the one with the least amount of crosslinking and/or branching that occurs due to biuret or urea linkages. Within limits, as more water is added to a foam formulation, the crosslinking of the polymers is increased so that the density may be reduced to obtain a particular firmness value. As a result, the economics are such that when a foam manufacturer lowers the density by increasing the amount of water used in the formulation, the cost of the foam per unit volume is decreased. However, with increasing amounts of water, the foamed product which is formed has a stiffness which is undesirable for cushioning material.

In the past, efforts to reduce the stiffness of foams by substantially decreasing the water content have also met with little success. A reduction in the amount of water in polyurethane formulations will decrease the number of crosslinking reactions which take place. However, this produces a softening of the foam with an undesirable loss in the maximum firmness value. Moreover, since the density increases considerably when the amount of water is reduced, the cost of the foam is increased and consequently the economic aspects become unattractive. Thus, when the amount of water used is reduced to the point where it is just possible to manufacture a foam with sufficient firmness for seating purposes, the resulting advantages in properties are not so great that the extra cost can be justified.

Various attempts have been made to use fillers, reinforcing and/or extending agents in order to lower the cost of the polyurethane foams. It has been found, however, that in most instances fillers have a deteriorating effect on the various physical properties and characteristics of the foams, even though they show reduction in costs per unit volume. Generally, foams containing fillers have their physical properties, such as resilience, fatigue strength, rubberiness, tensile strength and elongation impaired, thereby making the filled polyurethane foams less satisfactory for commercial use.

The addition of fillers renders the polyurethane foams less suitable for use as cushioning materials, since while they do increase the load-carrying capacity of the foamed cushions at high deflection, they also greatly increase the load carrying value at low deflection, making the cushions feel stiff and uncomfortable.

Accordingly, it is an object of the present invention to minimize the foregoing disadvantages in polyurethane foams used for cushioning purposes.

It is another object of this invention to provide an improved polyurethane foam having a relatively low load-carrying capacity at relatively low deflection and a relatively high load-carrying capacity at high deflection, and a method of producing such foams.

It is a further object of this invention to provide improved cellular polyether urethane materials which have good resilience properties and weight characteristics resembling those of rubber latex foams.

It is still another object of this invention to provide a polyether urethane foam which has improved fatigue characteristics, reduced hysteresis, improved resistance to "bottoming out," and which can be made at a low cost to successfully compete with foam rubber in the cushioning field.

In attaining the objects of this invention, one feature resides in adding to the reaction mixture a particular mineral in finely divided form in an amount sufficient to impart the desired properties to the polyurethane foam which is formed.

Another feature resides in the use of a lower amount of water in the reaction mixture than has heretofore been used in making commercial polyurethane foamed products.

Another feature resides in the fact that the mineral used must have a particle size coming within a particular range and which is different from sizes which have heretofore been used in preparing commercial polyurethane foamed products.

Other objects, features, and advantages of this invention will become more apparent from the following description thereof.

It has now been discovered that it is possible to obtain improved polyurethane foams for cushioning materials which have both a soft initial feel and a high load-carrying capacity at a relatively high deflection such as is normally encountered in seat cushion applications, by incorporating the mineral, barytes, in finely divided form into the reaction mixture of the polyol and the polyisocyanate. Barytes is a naturally occurring mineral and is also referred to as barite.

The particles of barytes which are used in this invention are finely divided and have an off-white color. Naturally colored barytes may also be employed if the color of the foam is not a factor. However, for some unexplained reason, customers prefer white polyurethane foams for cushioning materials, even though colored foams have the identical improved properties and the foamed product is hidden from view during use, i.e., when it is upholstered.

Heretofore, the average particle size of the fillers employed in commercial polyurethane foamed products has generally been less than 5 microns, most often about 1 micron. However, when these fillers are employed in this invention, unsatisfactory results are obtained. To achieve satisfactory results according to this invention, it is necessary that the average particle size of the barytes be 5 microns or greater. Preferably, the average particle size is from 6 to 10 microns, although particles averaging up to 50 microns and greater may also be used.

Since it is difficult and expensive to obtain barytes wherein all of the particles are of a particular average micron size, it has been found that the critical size of the barytes useful for purposes of this invention is better defined in terms of the percentage of particles which would pass through particular sieves of particular sizes. Referring to the accompanying drawing, Curve A represents the lower particle size and Curve B the higher particle size which can be used for purposes of this invention. When the percentages of particles fall within these curves, the polyurethane which is produced possesses the most desired characteristics approaching those of foam rubber.

Curve "A" was determined by the method outlined in C. K. Williams & Company Research Department procedure dated October 30, 1945, by R. A. Stephans, entitled "The Use of the Andreason Pipette for Determining the Particle Size Distribution of Pigment & Fine Powders."

Curve "B" was determined by a combination wet test and dry test sieve analysis as follows:

100 grams of a composite sample were placed in a Tyler 500 mesh deep frame sieve. The sample was wetted with a 1% solution of Calgon* detergent and washed with tap water. The sample was rewetted with 1% Calgon detergent solution and washed with tap water until clear water passed through the sieve. The sample was dried and the residue weighed.

25 grams of the residue were placed in a Tyler 150 mesh Ro-Tap testing sieve on top of a nest of 200, 250, 325, 400, and 500 mesh sieves.

The nest was placed in a Tyler Ro-Tap testing sieve shaker and sieved for a period of one (1) hour.

The nest of sieves was removed and separated and the residues on each sieve were weighed.

The percent passing through each mesh was calculated by relating the amount involved to the original 100 gram sample before the wet wash.

In accordance with the present invention, the barytes may be added by dispersing the particles in the reaction system together with the polyether polyol and the polyisocyanate reactants and the water, or it may be added after the reaction between the polyether polyol and the polyisocyanate takes place, but before the beginning of the foaming reaction.

The amount of barytes that is added to the polyurethane foam can vary from about 50 to about 150 parts by weight based on 100 parts of the polyether polyol, depending on the end use of foam and the particular properties which are desired. Excellent polyurethane foam has been formed when the amount of barytes is from 85 to 115 parts per 100 parts of polyether polyol.

In most commercial operations for making polyurethane foam, the amount of water necessary in the reaction is from 2.75 to 4.25 parts by weight for each 100 parts of polyol. However, according to the present invention, the amount of water is reduced to considerably less; namely, from about 0.5 to about 2.00 parts by weight of the polyol. It has been found that when the amount of water is maintained within these limits polyurethane foamed products are produced exhibiting satisfactory resistance to "bottoming out." Furthermore, when the amount of water is within the preferred range of from 1.0 to 1.75, the polyurethane polymer is essentially of the linear type. When the amount of water present was from above 2.00 to 2.25 parts by weight, quite a difference in the end product was noted, due to the crosslinking that occurred.

The density of the linear foam is maintained by increasing the particle size of the barytes. The preferred density, however, is from about 3.0 to 4.2 lbs. per cubic foot. Foams of such density form a product which is highly suitable for cushioning purposes, such as for chair seats, couch seats, mattresses, and the like, and compare most favorably with foam rubber cushioning.

The reaction between polyols and polyfunctional isocyanates to form foamed polyurethanes is very well known. This reaction may be of the "one shot" type where the ingredients are reacted and simultaneously foamed, or it may be of the "two stage" type where the polyol, such as the polyalkylene ether glycol, is reacted with the polyfunctional isocyanate to form a partially reacted prepolymer, and subsequently adding thereto an activator mixture which generally comprises water and a suitable reaction catalyst to form the desired cellular or foamed polyurethane.

The term "polyether polyol" as used throughout this specification and claims refers to a polyether polyol con-

---

* Calgon is sodium hexameta phosphate.

taining terminal hydroxy groups. Included within this term are polyalkylene ether glycols, polyalkylene ether thioether glycols, polyalkylene-arylene ether glycols, and polyalkylene-arylene ether thioether glycols.

These may be represented by the formula HO(RO)$_n$H in which R stands for an alkylene radical and $n$ is an integer greater than 1.

In the polyethers used in this invention, $n$ is sufficiently large that the polyalkylene ether glycol has a molecular weight of at least 600. Not all the alkylene radicals present need be the same. These compounds are ordinarily derived from the polymerization of cyclic ether such as alkylene oxides or dioxolanes or from the condensation of glycols.

Poly glycols formed by the copolymerization of the mixture of different alkylene oxides or glycols may be used. The alkylene radicals may be straight-chained or they may be branch-chained as in the compound known as polypropylene ether glycol which has the formula

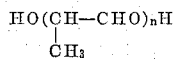

The polyalkylene ether glycols are either viscous liquids or waxy solids. Those useful in the process of this invention have an average molecular weight which is at least 600 and may be as high as 10,000. The molecular weights referred to here and elsewhere throughout the specification and claims are calculated from the hydroxyl numbers of the polyglycols, and therefore represent the number average values. Specific examples of these glycols are polybutylene ether glycol, polyethylene ether glycol, polypropylene ether glycol, as well as others.

Mixed polyether polyols can also be used, such as condensation products of an alkylene oxide with a polyhydric alcohol containing three to six primary hydroxyl groups, e.g., pentaerythritol, glycerol. Polypropylene glycol and mixed polypropylene and ethylene glycols of high molecular weight and higher polyalkylene glycols can be made by condensing alkylene oxide with a polyhydric alcohol. High molecular weight polyethylene glycols and polypropylene glycols can be mixed together and the resulting polyglycol mixture employed. It is also possible to obtain high molecular weight polyalkylene glycols by the copolymerization of ethylene oxide and propylene oxide and the like, to give a mixed high molecular weight polyethylene-polypropylene glycol.

The polyalkylene ether-thioether glycols may be represented by the formula HO(QY)$_n$H, wherein Q represents hydrocarbon radicals at least some of which are alkylene, Y represents chalcogen atoms some of which are sulfur and the rest oxygen, and $n$ is an integer sufficiently large that the glycol has a molecular weight of at least 600. These glycols may be conveniently prepared by condensing together various glycols and thiodiglycol in the presence of a catalyst, such as p-toluene sulfonic acid.

The polyalkylene-arylene ether glycols are similar to the polyalkylene ether glycols except that some arylene radicals are present. Part of the ether oxygens may be replaced with sulfur. In general, the phenylene and naphthalene radicals are preferred with or without substituents such as alkyl or alkylene groups.

Hydroxyl polyethers and hydroxyl polythioethers which are suitable for use in the process of the instant invention are compounds containing terminal hydroxyl groups and a plurality of divalent organic radicals linked by oxygen and/or sulfur atoms. They may be represented by the general formula HO—R—X—(R—X)$_n$—OH in which R is a divalent organic radical, which may contain further OH groups if a branched polyether is to be considered X is oxygen or sulfur and $n$ is a positive whole number.

Hydroxyl polyethers or polythioethers in which the divalent organic radical (R in the above formula) is an aliphatic radical, such as ethylene, (iso-) propylene and (iso-)butylene, are particularly suitable. However, the divalent organic radical may also be of cycloaliphatic or aromatic nature, such as p-xylylene and dimethyl-diphenylene-methane.

Any of a wide variety of organic polyisocyanates may be employed in the reaction including aromatic, aliphatic and cycloaliphatic polyisocyanates or combinations of these types, as long as the isocyanates have at least two functional isocyanate groups, and preferably from two to three isocyanate groups. Mixtures of two or more organic polyisocyanates may be used. Representative compounds include 2,4-toluene diisocyanate,
phenylene diisocyanate,
4-chloro-1,3-phenylene diisocyanate,
4,4-biphenylene diisocyanate,
1,5-naphthalene diisocyanate,
1,4-tetramethylene diisocyanate,
1,6-hexamethylene diisocyanate,
1,10-decamethylene diisocyanate,
1,4-cyclohexylene diisocyanate,
4,4-methylene bis-cyclohexylene diisocyanate,
4,4-methylene biscyclohexyl isocyanate, and
1,5-tetrahydronaphthalene diisocyanate.

The polyurethane-forming reactants are the polyether polyol and the polyisocyanate. The cellular polyether urethanes are formed by reacting any of the above-described polyether polyols with any of the above polyisocyanates. The ingredients are reacted in an equivalent weight ratio of polyisocyanate to polyether polyol of about 1:1 to 12:1. The resulting reaction product is expanded with a blowing agent which generally is carbon dioxide formed from the reaction between excess polyisocyanate and water, or a gas formed by the volatilization of a readily liquefied gas propellant such as an alkane-substituted halogen gas (e.g. Freons) or a gas formed by the decomposition of a compound such as ammonium carbonate. The polyurethane foams that are most preferred are made by reacting a nonlinear slightly branched polyalkylene ether glycol with a diisocyanate and a small amount of water, or by reacting a linear polyether glycol with a mixture of a di- and triisocyanate and water.

The actual reaction conditions are to a large extent a matter of choice, and the reaction temperature can vary anywhere from room temperature to as high as about 150° C.

Any representative catalyst for the diisocyanate polyether reactions, all of which catalysts are well known, may be employed in this invention. They are, for example, tertiary amines such as diethylaminoethanol adipate, dibutylaminoethanol, butyl diethanolamine, n-methyl morpholine, n-octyl morpholine, pyridine propanol, 1-n-amyl pyridine, organic metallic compounds, such as stannous octoate, stannous linoleate, stannous quinolinolate, cobalt naphthanate, nickel naphthanate, and the like. Further catalysts that can be used are ammonium molybdate, ammonium paramolybdate, molybdenum pentachloride and molybdenum bis-acetyl acetonate, methyl ethyl ketone peroxide, benzoyl peroxide, hydrogen peroxide, and the like. The water and any of the reaction catalysts set forth herein which influence the polyurethane reaction may be added together as an activator mixture.

Various other catalysts and crosslinking agents, such as ethylene diamine, tetramethylbutane diamine, etc.; polyamines such as triamines, tetramines including hexamethylene tetramine, etc.; and agents such as trihexyl amine, triethyl amine, tributyl amine, etc., may be employed in the process of this invention.

As an optional ingredient, the reaction mixture can also contain a small amount of silicone oil, such as dimethyl siloxane polymer, which is added to stabilize the foam and insure good foam structure.

The following example is readily illustrative of the present invention, but is not considered as limiting its scope in any manner whatever.

EXAMPLE I

Polyether urethane foam material with finely divided barytes particles incorporated therein was prepared from the following composition:

| | Parts |
|---|---|
| Molecular weight 3000 polypropylene ether glycol | 100 |
| Toluene diisocyanate | 24.12 |
| Water | 1.5 |
| Barytes | 100 |
| Trichloromonofluoromethane | 10 |
| Tin octoate catalyst | 0.65 |
| Tetramethyl butane diamine | 0.35 |
| Silicone oil (dimethyl siloxane polymer viscosity 100 centistokes at 100° F.) | 1.0 |

The size of the finely divided barytes particles was ascertained in accordance with the method described above in connection with Curve B of the drawing. The barytes particles were found to be of a size corresponding to Curve C of the drawing. The polypropylene ether glycol, toluene diisocyanate, water, barytes, and all the other reactants were mixed together at 80° F. The resultant foam product was formed by the liberation of carbon dioxide from the reaction of the water and the diisocyanate groups of the polyisocyanate with the polyether, which, together with the presence of the fluorocarbon, gave the product its cellular structure. The polyurethane foam had an average density of 4.2 lbs. per cubic foot, and compared with the average density of foam rubber latex products, which is from about 3.5 to 5 lbs./cubic foot. The product was flexible, exhibiting no stiffness, and yet had a high load-carrying capacity at high deflection.

A control polyurethane foam made without the barytes and with 3.75 parts of water had a density of 1.25 lbs. per cubic foot and exhibited a substantially lower load-carrying capacity at high deflection when compared to the foam of the invention.

It is important to note that the polyether urethane foams of this invention do not suffer from undesirable effects in their properties due to the presence of the barytes. The foams are flexible and do not exhibit any stiffness. The foams of this invention have adequate properties of tensile strength and good properties of resiliency, fatigue strength, and low load-carrying capacity at low deflection and high load-carrying capacity at high deflection, making them aptly suited for a wide variety of applications, particularly in the cushioning field.

It will be evident from the foregoing that barytes is preferred as the mineral filler in the polyurethane compositions.

It is understood that various modifications will be apparent to and can readily be made by those skilled in the art, without departing from the scope and spirit of this invention. Accordingly, it is not intended that the scope of the claims appended hereto be limited to the description set forth herein, but rather that the claims be construed as encompassing in the invention all features which would be treated as equivalents thereof by those skilled in the art to which this invention pertains.

What is claimed is:

1. In a process for producing a foamed polyurethane which comprises reacting an organic polyisocyanate having at least two functional isocyanate groups with a polyether polyol having hydrogen atoms reactive with said isocyanate groups in the presence of an activator mixture comprising water and a catalyst for the reaction, to form said foamed polyurethane, the improvement which comprises reacting said polyisocyanate and said polyol in the presence of from about 0.5 to about 2.00 parts by weight of water per 100 parts by weight of said polyol and in the presence of about 50 to 150 parts by weight of finely divided particles of barytes based upon 100 parts by weight of said polyol, said barytes particles being of a size such that they will fall within the curves A and B of the drawing in the percentages indicated.

2. The process of claim 1 wherein said water is present in an amount of about 1 to 1.75% by weight of said polyol.

3. The process of claim 1 wherein the barytes is added in the amount of from about 85 to 115 parts by weight of barytes per 100 parts by weight of said polyol.

4. The process of claim 1 wherein the amount of barytes added is about equal in weight to said polyol.

5. The process of claim 1 wherein the polyether polyol is polyalkylene ether polyol and has a molecular weight of about 3000.

6. The process of claim 5 wherein the polyalkylene ether polyol is a polypropylene ether glycol.

7. The process of claim 1 wherein the organic polyisocyanate is toluene diisocyanate.

8. The process as defined in claim 1 wherein said polyether polyol is a polyether glycol.

9. A foamed polyurethane product made in accordance with the process defined in claim 1.

10. The foamed polyurethane product of claim 9 having a density of about 3.0 to 4.2 pounds per cubic foot.

11. In a process for producing a foamed polyurethane which comprises reacting an organic polyisocyanate having at least two functional isocyanate groups with a polyether polyol having hydrogen atoms reacted with said isocyanate groups in the presence of an activator mixture comprising water and a catalyst for the reaction, to form said foamed polyurethane, the improvement which comprises reacting said polyisocyanate and said polyol in the presence of from about 0.5 to about 2.0 parts by weight of water per 100 parts by weight of said polyol and in the presence of about 50 to 150 parts by weight of finely divided particles of barytes of an average particle size of from about 5 to 50 microns, based upon the weight of 100 parts of said polyol.

12. The process as defined in claim 11 wherein said polyether polyol is a polyether glycol.

References Cited by the Examiner

UNITED STATES PATENTS

| 2,998,413 | 8/1961 | Holtschmidt et al. | 260—2.5 |
| 3,015,634 | 1/1962 | Ferrigno | 260—2.5 |
| 3,021,290 | 2/1962 | Gmitter et al. | 260—2.5 |
| 3,024,209 | 3/1962 | Ferrigno | 260—2.5 |

FOREIGN PATENTS

| 867,235 | 5/1961 | Great Britain. |

OTHER REFERENCES

Barringer: "Rigid Urethane Foams-11 Chemistry and Formulation," Dupont Elastomers Chem. Dept., Bulletin HR-26, April 1958, pp. 4 to 14.

Mattiello: "Protective and Decorative Coatings," vol. II, p. 164, copyright 1942, John Wiley & Sons Inc., New York, N. Y.

LEON J. BERCOVITZ, *Primary Examiner.*

DONALD E. CZAJA, *Examiner.*